United States Patent
Bao et al.

(10) Patent No.: US 12,490,283 B2
(45) Date of Patent: Dec. 2, 2025

(54) METHODS AND NODES FOR IAB INTER-DONOR MULTI-PARENT RESOURCE COORDINATION

(71) Applicant: TELEFONAKTIEBOLAGET LM ERICSSON (PUBL), Stockholm (SE)

(72) Inventors: Lei Bao, Gothenburg (SE); Filip Barac, Huddinge (SE); Magnus Åström, Lund (SE); Boris Dortschy, Vendelsö (SE); Yezi Huang, Täby (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 315 days.

(21) Appl. No.: 18/262,235

(22) PCT Filed: Jan. 25, 2022

(86) PCT No.: PCT/IB2022/050653
§ 371 (c)(1),
(2) Date: Jul. 20, 2023

(87) PCT Pub. No.: WO2022/157749
PCT Pub. Date: Jul. 28, 2022

(65) Prior Publication Data
US 2024/0114530 A1    Apr. 4, 2024

Related U.S. Application Data

(60) Provisional application No. 63/141,281, filed on Jan. 25, 2021.

(51) Int. Cl.
*H04W 72/29* (2023.01)
*H04L 5/00* (2006.01)
(Continued)

(52) U.S. Cl.
CPC ........... *H04W 72/27* (2023.01); *H04L 5/0053* (2013.01); *H04W 72/02* (2013.01); *H04W 72/51* (2023.01); *H04W 72/566* (2023.01); *H04W 92/20* (2013.01)

(58) Field of Classification Search
CPC .. H04B 7/15528; H04L 5/0053; H04W 72/02; H04W 72/20; H04W 72/25;
(Continued)

(56) References Cited

U.S. PATENT DOCUMENTS 12,156,267 B2 * 11/2024 Tiirola ................. H04W 76/20
12,273,933 B2 *  4/2025 Maya ................... H04W 72/27
(Continued)

FOREIGN PATENT DOCUMENTS

WO       2020207745 W      10/2020
WO       2022029580         2/2022

OTHER PUBLICATIONS

3GPP TR 38.874 v16.0.0 Technical Report; 3rd Generation Partnership Project; Technical Specification Group Radio Access Network; NR; Study on Integrated Access and Backhaul (Release 16)—Dec. 2018 https://portal.3gpp.org/desktopmodules/Specifications/SpecificationDetails.aspx?specificationid=3232.
(Continued)

*Primary Examiner* — Frank Duong
(74) *Attorney, Agent, or Firm* — ERICSSON INC.

(57) ABSTRACT

There is provided a method for resource coordination in a first donor Integrated Access Backhaul (IAB) node connected to a first parent IAB node which is connected to an IAB node, the IAB node further being connected to a second parent IAB node which is connected to a second donor IAB node. The method comprises: sending, to the second donor IAB node, an indication of a first resource configuration for the IAB node, the first resource configuration determined by
(Continued)

the first donor IAB node; receiving, from the second donor IAB node, a request for a second resource configuration for the IAB node; and determining a resource configuration for the IAB node based at least on one of the first resource configuration and the second resource configuration.

20 Claims, 9 Drawing Sheets

(51) Int. Cl.
    *H04W 72/02*     (2009.01)
    *H04W 72/27*     (2023.01)
    *H04W 72/51*     (2023.01)
    *H04W 72/566*     (2023.01)
    *H04W 92/20*     (2009.01)

(58) Field of Classification Search
    CPC ..... H04W 72/27; H04W 72/29; H04W 72/51; H04W 72/566; H04W 92/12; H04W 92/14; H04W 92/16; H04W 92/18; H04W 92/20; H04W 92/22; H04W 92/24
    See application file for complete search history.

(56) References Cited

U.S. PATENT DOCUMENTS

| | | | |
|---|---|---|---|
| 2021/0176746 A1* | 6/2021 | Abedini | H04W 28/18 |
| 2022/0167331 A1* | 5/2022 | Huang | H04W 28/16 |
| 2023/0180248 A1* | 6/2023 | Shim | H04L 5/001 |
| 2023/0337005 A1* | 10/2023 | Huang | H04W 28/0861 |
| 2023/0388995 A1* | 11/2023 | Huang | H04L 5/0094 |
| 2024/0008017 A1* | 1/2024 | Huang | H04L 5/0023 |

OTHER PUBLICATIONS

3GPP TS 37.340 V16.3.0, 3rd Generation Partnership Project; Technical Specification Group Radio Access Network; Evolved Universal Terrestrial Radio Access (E-UTRA) and NR; Multi-connectivity; Stage 2 (Release 16), p. 1-83, Sep. 2020, France https://portal.3gpp.org/desktopmodules/Specifications/SpecificationDetails.aspx?specificationid=3198.

Ericsson, "Resource Multiplexing and DC in Enhanced IAB", 3GPP Draft, R2101695, Mobile Competence Centre, vol. RAN WG1, No. E-Meeting, pp. 1-14, Jan. 2021, XP051971848, France.

Qualcomm Incorporated "Inter-donor coordination of IAB-DU Resource Management", 3GPP Draft, R3-206259, vol. RAN WG3, No. E-Meeting, pp. 1-4, Oct. 2022, France.

RP-201293, Qualcomm, New WID on Enhancements to Integrated Access and Backhaul, 3GPP TSG RAN Meeting #88e, 5 pages, Jun. 29-Jul. 3, 2020, Electronic Meeting.

* cited by examiner

Spanning Tree         Directed Acyclic Graph

METHODS AND NODES FOR IAB INTER-DONOR MULTI-PARENT RESOURCE COORDINATION

RELATED APPLICATIONS

The present application claims the benefit of and priority to U.S. Provisional Patent Application No. 63/141,281 filed Jan. 25, 2021, entitled "IAB Inter-Donor multi-parent resource coordination," the disclosure of which is hereby incorporated herein by reference in its entirety.

TECHNICAL FIELD

The present description generally relates to wireless communication systems and more specifically to handle resource coordination in Integrated Access and Backhaul (IAB) networks.

BACKGROUND

Integrated Access and Backhaul Overview

Densification via the deployment of increasing base stations (macro or micro base stations) is one of the mechanisms that can be employed to satisfy the ever-increasing demand for more and more bandwidth/capacity in mobile networks. Due to the availability of more spectrum in the millimeter wave (mmw) band, deploying small cells that operate in this band is an attractive deployment option for these purposes. However, deploying fiber to the small cells, which is the usual way in which small cells are deployed, can end up being very expensive and impractical. Thus, employing a wireless link for connecting the small cells to the operator's network is a cheaper and practical alternative with more flexibility and shorter time-to-market. One such solution is an Integrated Access and Backhaul (IAB) network, where the operator can utilize part of the radio resources for the backhaul link.

In FIG. 1, an IAB deployment that supports multiple hops is presented. The IAB donor node (in short IAB donor) has a wired connection to the core network and the IAB-nodes are wirelessly connected using New Radio (NR) to the IAB donor, either directly or indirectly via another IAB-node. The connection between the IAB donor/node and User Equipments (UEs) is called access link, whereas the connection between two IAB-nodes or between an IAB donor and an IAB-node is called backhaul link.

Furthermore, as shown in FIG. 2, the adjacent upstream node which is closer to the IAB donor node of an IAB-node is referred to as a parent node of the IAB-node. The adjacent downstream node which is further away from the IAB donor node of an IAB-node is referred to as a child node of the IAB-node. The backhaul link between the parent node and the IAB-node is referred to as parent (backhaul) link, whereas the backhaul link between the IAB-node and the child node is referred to as child (backhaul) link IAB Architecture As one major difference of the IAB architecture compared to Release (Rel)-10 Long Term Evolution (LTE) relay (besides lower layer differences) is that the IAB architecture adopts the Central-Unit/Distributed-Unit (DU/DU) split of gNodeBs (gNBs) in which time-critical functionalities are realized in the DU closer to the radio, whereas the less time-critical functionalities are pooled in the CU with the opportunity for centralization. Based on this architecture, an IAB donor contains both CU and DU functions. In particular, it contains all CU functions of the IAB-nodes under the same IAB donor. Each IAB-node then hosts the DU function(s) of a gNB. In order to be able to transmit/receive wireless signals to/from the upstream IAB-node or IAB donor, each IAB-node has a mobile termination (MT), a logical unit providing a necessary set of UE-like functions. Via the DU, the IAB-node establishes Radio Link Control (RLC)-channel to UEs and/or to MTs of the connected IAB-node(s). Via the MT, the IAB-node establishes the backhaul radio interface towards the serving IAB-node or IAB donor. FIG. 3 shows a reference diagram for a two-hop chain of IAB-nodes under an IAB donor.

IAB Topologies

Wireless backhaul links are vulnerable to blockage, e.g., due to moving objects such as vehicles, due to seasonal changes (foliage), severe weather conditions (rain, snow or hail), or due to infrastructure changes (new buildings). Such vulnerability also applies to IAB-nodes. Also, traffic variations can create uneven load distributions on wireless backhaul links leading to local link or node congestion. In view of those concerns, the IAB topology supports redundant paths as another difference compared to the Rel-10 LTE relay.

The following topologies are considered in IAB as shown in FIG. 4: 1. Spanning tree (ST) and 2. Directed acyclic graph (DAG).

It means that one IAB-node can have multiple child nodes and/or have multiple parent nodes. Particularly regarding multi-parent topology, different scenarios may be considered as shown in FIG. 5. For example:

IAB-9 connects to IAB-donor 1 via two parent nodes IAB-5 and IAB-6 which connect to the same grandparent node IAB-1;

IAB-10 connects to IAB-donor 1 via two parent nodes IAB-6 and IAB-7 which connect to different grandparent nodes IAB-1 and IAB-2;

IAB-8 connects to two parent nodes IAB-3 and IAB-4 which connect to different IAB donor nodes IAB-donor 1 and IAB-donor 2.

The multi-connectivity or route redundancy may be used for back-up purposes. Also redundant routes can be used concurrently, e.g., to achieve load balancing, reliability, etc.

Resource Coordination

In case of in-band operation, the IAB-node is typically subject to the half-duplex constraint, i.e., an IAB-node can only be in either transmission or reception mode at a time. Rel-16 IAB mainly consider the time-division multiplexing (TDM) case where the MT and DU resources of the same IAB-node are separated in time. Based on this consideration, the following resource types have been defined for IAB MT and DU, respectively.

From an IAB-node MT point-of-view, as in Rel-15, the following time-domain resources can be indicated for the parent link: Downlink (DL) time resource, Uplink (UL) time resource, Flexible (F) time resource.

From an IAB-node DU point-of-view, the child link has the following types of time resources: DL time resource, UL time resource, F time resource, Not-available (NA) time resources (resources not to be used for communication on the DU child links).

Each of the downlink, uplink and flexible time-resource types of the DU child link can belong to one of two categories:

Hard (H): The corresponding time resource is always available for the DU child link;

Soft (S): The availability of the corresponding time resource for the DU child link is explicitly and/or implicitly controlled by the parent node.

The IAB-DU resources are configured per cell, and the H/S/NA attributes for the DU resource configuration are explicitly indicated per-resource type (D/U/F) in each slot. As a result, the semi-static time-domain resources of the DU part can be of seven types in total: Downlink-Hard (DL-H), Downlink-Soft (DL-S), Uplink-Hard (UL-H), Uplink-Soft (UL-S), Flexible-Hard (F-H), Flexible-Soft (F-S), and Not-Available (NA). The coordination relation between MT and DU resources are listed in Table 1.

value is used as the index in a Radio Resource Control (RRC) configured AI (Availability Indicator) Availability-Combination table. Each entry in the AI AvailabilityCombination table indicates the resource availability for a set of consecutive slots. Each element of each entry in the AI AvailabilityCombination table indicates the resource availability in a slot. The resource availability can take 8 values as in Table 2.

TABLE 1

Coordination between MT and DU resources of an IAB-node.

| | | MT configuration | | |
|---|---|---|---|---|
| | | DL | UL | Flexible |
| DU configurati | DL-H | DU: can transmit on DL unconditionally; MT: not available. | DU: can transmit on DL unconditionally; MT: not available. | DU: can transmit on DL unconditionally; MT: not available. |
| | DL-S | DU: can transmit conditionally; MT: available on DL. | DU: can transmit conditionally; MT: available on UL. | DU: can transmit conditionally; MT: available on DL & UL. |
| | UL-H | DU: can schedule UL unconditionally; MT: not available. | DU: can schedule UL unconditionally; MT: not available. | DU: can schedule UL unconditionally; MT: not available. |
| | UL-S | DU: can schedule UL conditionally; MT: available on DL. | DU: can schedule UL conditionally; MT: available on UL. | DU: can schedule UL conditionally; MT: available on DL & UL. |
| | F-H | DU: can transmit on DL or schedule UL unconditionally; MT: not available. | DU: can transmit on DL or schedule UL unconditionally; MT: not available. | DU: can transmit on DL or schedule UL unconditionally; MT: not available. |
| | F-S | DU: can transmit on DL or schedule UL conditionally; MT: available on DL. | DU: can transmit on DL or schedule UL conditionally; MT: available on UL. | DU: can transmit on DL or schedule UL conditionally; MT: available on DL & UL. |
| | NA | DU: not available; MT: available on DL. | DU: not available; MT: available on UL. | DU: not available; MT: available on DL & UL. |

Furthermore, a DU function may correspond to multiple cells, including cells operating on different carrier frequencies. Similarly, an MT function may correspond to multiple carrier frequencies. This can either be implemented by one MT unit operating on multiple carrier frequencies, or be implemented by multiple MT units, each operating on one carrier frequency. The H/S/NA attributes for the per-cell DU resource configuration should take into account the associated MT carrier frequency(ies).

According to the definition, the explicitly configured Soft DU resource is by default unavailable if it is not indicated as available. There are two ways to indicate the availability from the parent node: implicit indication and explicit indication. In case of implicit indication, the IAB-node knows, via indirect means, such as lack of scheduling grant, no data available at MT, the IAB-node being capable of simultaneous DU and MT, etc., that the DU resource can be used without impacting the MT's ability to transmit/receive.

In addition to such implicit means, the IAB-node may also receive explicit indication from the parent node about the availability. The purpose of having the explicit indication is to allow for more dynamic utilization of the MT and DU resources. To serve this purpose, Downlink Control Information (DCI) Format 2_5 is defined to indicate DU-IA (DU indicated as available) to an IAB-node using a new Availability Indication (AI)-Radio Network Temporary Identifier (RNTI). This DCI contains one or multiple fields. Each field

TABLE 2

Value meaning of resource availability in DCI Format 2_5.

| Value | Meaning |
|---|---|
| 0 | D soft resources: no indication of availability U soft resources: no indication of availability F soft resources: no indication of availability |
| 1 | D soft resources: indicated available U soft resources: no indication of availability F soft resources: no indication of availability |
| 2 | D soft resources: no indication of availability U soft resources: indicated available F soft resources: no indication of availability |
| 3 | D soft resources: indicated available U soft resources: indicated available F soft resources: no indication of availability |
| 4 | D soft resources: no indication of availability U soft resources: no indication of availability F soft resources: indicated available |
| 5 | D soft resources: indicated available U soft resources: no indication of availability F soft resources: indicated available |
| 6 | D soft resources: no indication of availability U soft resources: indicated available F soft resources: indicated available |
| 7 | D soft resources: indicated available U soft resources: indicated available F soft resources: indicated available |

One of the objectives in the Rel-17 IAB WID RP-201293 is to have "specification of enhancements to the resource multiplexing between child and parent links of an IAB node, including: support for dual-connectivity scenarios defined by RAN2/RAN3 in the context of topology redundancy for improved robustness and load balancing."

According to the IAB TR 3GPP 38.874, an NR+NR dual-connected IAB-node can add redundant routes by establishing a Master Cell Group (MCG)-link to one parent node IAB-DU and an Secondary Cell Group (SCG)-link to another parent node IAB-DU. The dual-connecting IAB-MT will enable the SCG link using the Rel-15 NR-Dual Connectivity (DC) procedures. As described in TS 3GPP 37.340, NR+NR dual connectivity is a Multi-Radio Dual Connectivity (MR-DC) configuration with the SGC. In MR-DC, two or more Component Carriers (CCs) may be aggregated over two cell groups for the purpose of bandwidth extension.

SUMMARY

There exist some challenges. In Rel-16 IAB, from RAN1 perspective, only intra-donor multi-parent operation is supported. Rel-17 IAB has an ongoing discussing regarding potential enhancement for dual connectivity (DC) including inter-donor multi-parent operation. FIG. 6 shows an example of the inter-donor dual connectivity operation where the two parent nodes of the IAB-node-3 (IAB3) are under the control of two different donor-nodes, Donor-node-1 (Donor1) and Donor-node-2 (Donor2). According to the current specification, each IAB-DU has only one F1-AP connection towards the central unit, which in the example means that the semi-static resource configuration of IAB3-DU is entirely configured by Donor1-CU. Meanwhile, the resource configuration of the two-parent links will be handled by the respective donor-CU.

In the Intra-Donor multi-parent case, the single donor-CU can coordinate the usage of overlapping resource between the two-parent links, as well as the usage of overlapping resource between each parent link and the child link(s). For example, the coordination could be:

TDD pattern (Uplink/Downlink) alignment between the parent links;
H/S/NA resource configuration of IAB-DU(s);
H/S/NA resource configuration of the parent IAB-DU(s);
Explicit indication of IAB-DU soft resource: Providing one IAB parent-DU information about other IAB parent-DU's H/S/NA configuration.

FIG. 7 depicts the availability indication (DCI format 2_5) in a dual-parent case, where in the example the carrier components are associated to the MCG Cell-1 and SCG Cell-2 cells. As illustrated in the figure, both IAB-MT cells have overlapping spectrum with the IAB-DU Cell-1, while the IAB-DU Cell-2 only shares the spectrum with the IAB-MT Cell-2. Accordingly, the first parent node will provide the IAB-MT with one DCI format 2_5 for the DU resources configured as Soft for the pair {MT Cell-1 (MCG), DU Cell-1}, and the second parent node may provide the IAB-MT with two availability indicators for the {MT Cell-2 (SCG), DU Cell-1} pair and the {MT Cell-2 (SCG), DU Cell-2} pair, respectively. To determine the availability of the Soft DU resource of Cell-1, the IAB-node may consider the two availability indicators, {MT Cell-1 (MCG), DU Cell-1} and {MT Cell-2 (SCG), DU Cell-1}.

When the two parent nodes are controlled by different donor CUs, there is no existing solution for the donor-CUs to coordinate resource configuration and handle potential resource conflict. Thus, a method is needed to enable resource configuration and coordination for inter-donor dual-parent scenario.

This disclosure provides methods to make a plurality of parent nodes which are connected to different IAB donor nodes aware of IAB-DU resource configurations and IAB-node multiplexing capabilities.

According to the disclosure, when an IAB-node is connected to multiple parent nodes which belong to different IAB-donor-nodes, information about the IAB-node's capability to use the multiple parent links simultaneously is provided to the reference network function (or first donor IAB node), which is responsible for the DU resource configuration of the involved IAB-nodes, and the connected reference parent node.

The reference parent node connected to the reference network function may, via the peer network function, be provided with the resource configuration of the peer parent node(s), which serve the same IAB-node.

Furthermore, the peer network function (or second donor IAB node), and the peer parent node, which is under the control of the peer network function, may be made aware of the IAB-DU resource configurations, the IAB-node multiplexing capabilities, and the reference parent-DU resource configuration, via the reference network function. Based on the provided information, both the reference and peer network functions can coordinate the resource at the associated parent nodes by assigning the reference and peer parent-DU resource configurations accordingly. Based on the provided information, the reference and peer parent nodes can determine whether it can schedule transmissions with certain radio resources on the parent links to the IAB-node that they are both serving. Also, the peer parent node may, via the peer network function, send an IAB-DU resource configuration request to the reference network function.

According to an aspect, embodiments include methods performed by a network node. For example, a method, performed by a first donor IAB node may comprise sending, to the second donor IAB node, an indication of a first resource configuration for the IAB node, the first resource configuration determined by the first donor IAB node; receiving, from the second donor IAB node, a request for a second resource configuration for the IAB node; and determining a resource configuration for the IAB node based at least on one of the first resource configuration and the second resource configuration. Another method, performed by a second donor IAB node, may comprise: in response to determining that a first resource configuration for the IAB node received from the first donor IAB node is incompatible with resource configurations managed by the second donor IAB node, sending a request for a second resource configuration for the IAB node, to the first donor IAB node; and receiving an indication of a resource configuration for the IAB node, determined based at least on one of the first resource configuration and the second resource configuration.

According to an aspect, embodiments include a network node configured, or operable, to perform one or more functionalities (e.g. actions, operations, steps, etc.) as described herein.

In some embodiments, the network node may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

According to an aspect, some embodiments include a non-transitory computer-readable medium storing a computer program product comprising instructions which, upon being executed by processing circuitry (e.g., at least one processor) of the network node or wireless device, configure the processing circuitry to perform one or more functionalities as described herein.

The advantages/technical benefits of the embodiments of the present disclosure are:

The embodiments provide methods to enable resource coordination for an IAB-node connected to multiple parent nodes which are under control of different IAB-donor-nodes. The methods include resource coordination between parent nodes that belong to different donor nodes.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

Figure 1:
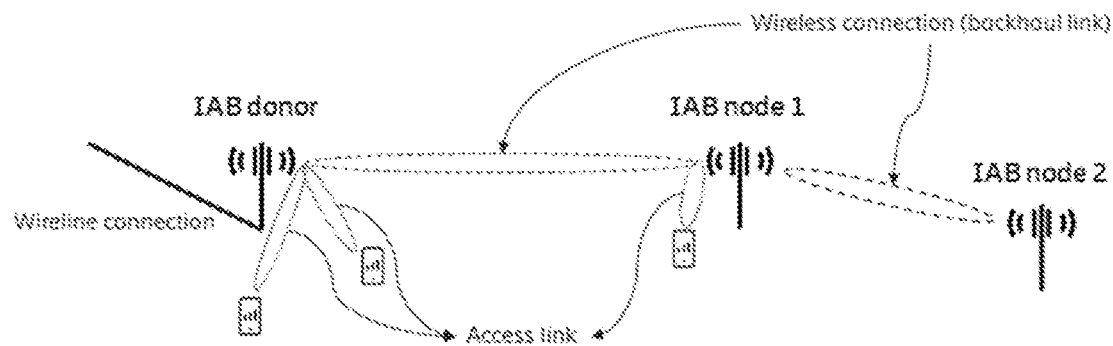
FIG. 1 illustrates an example of a Multi-hop deployment in an integrated access and backhaul (IAB) network.
Figure 2:
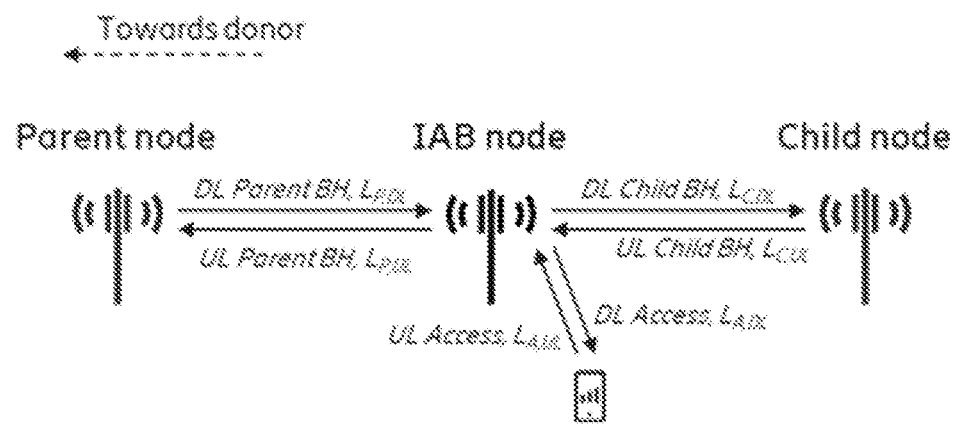
FIG. 2 illustrates an IAB network with IAB terminologies in adjacent hops.
Figure 3:
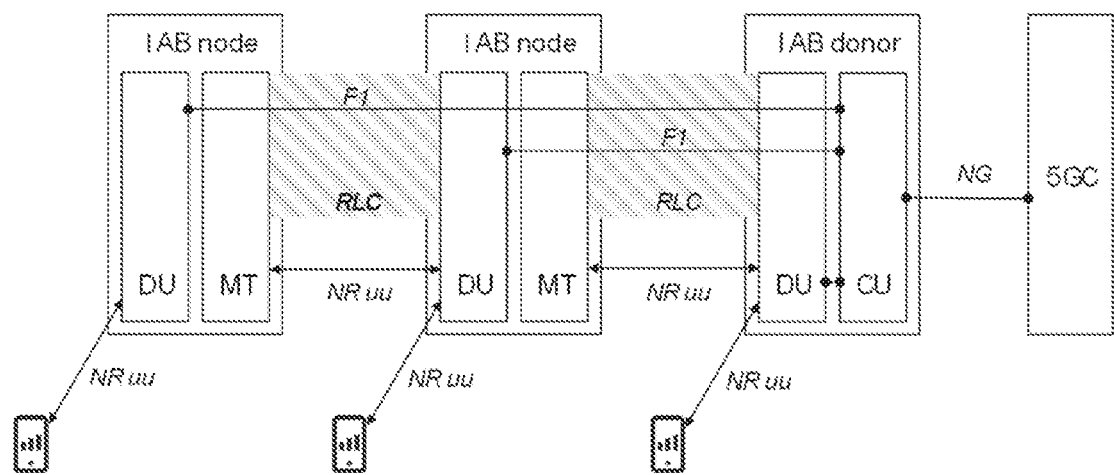
FIG. 3 illustrates an exemplary IAB architecture.
Figure 4:
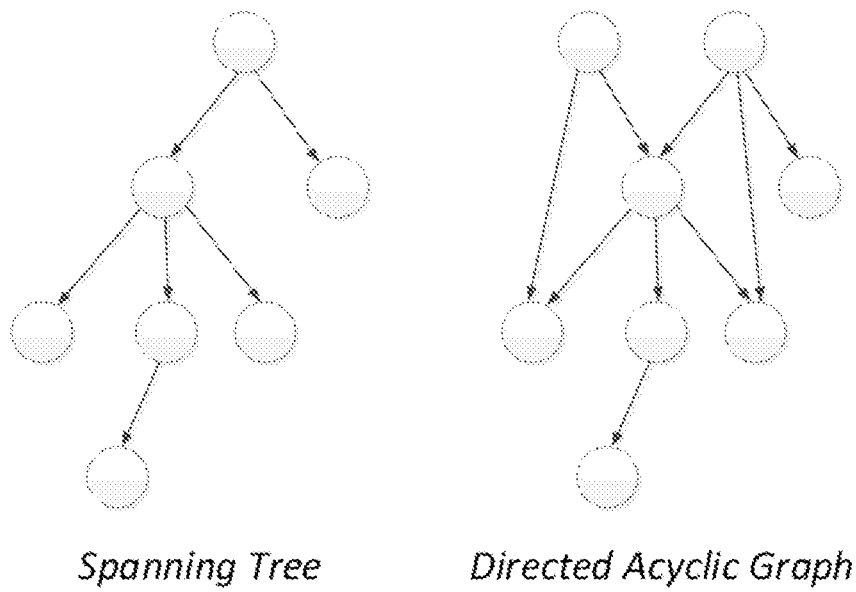
FIG. 4 are examples for ST and DAG; the arrow indicates the directionality of the graph edge.
Figure 5:
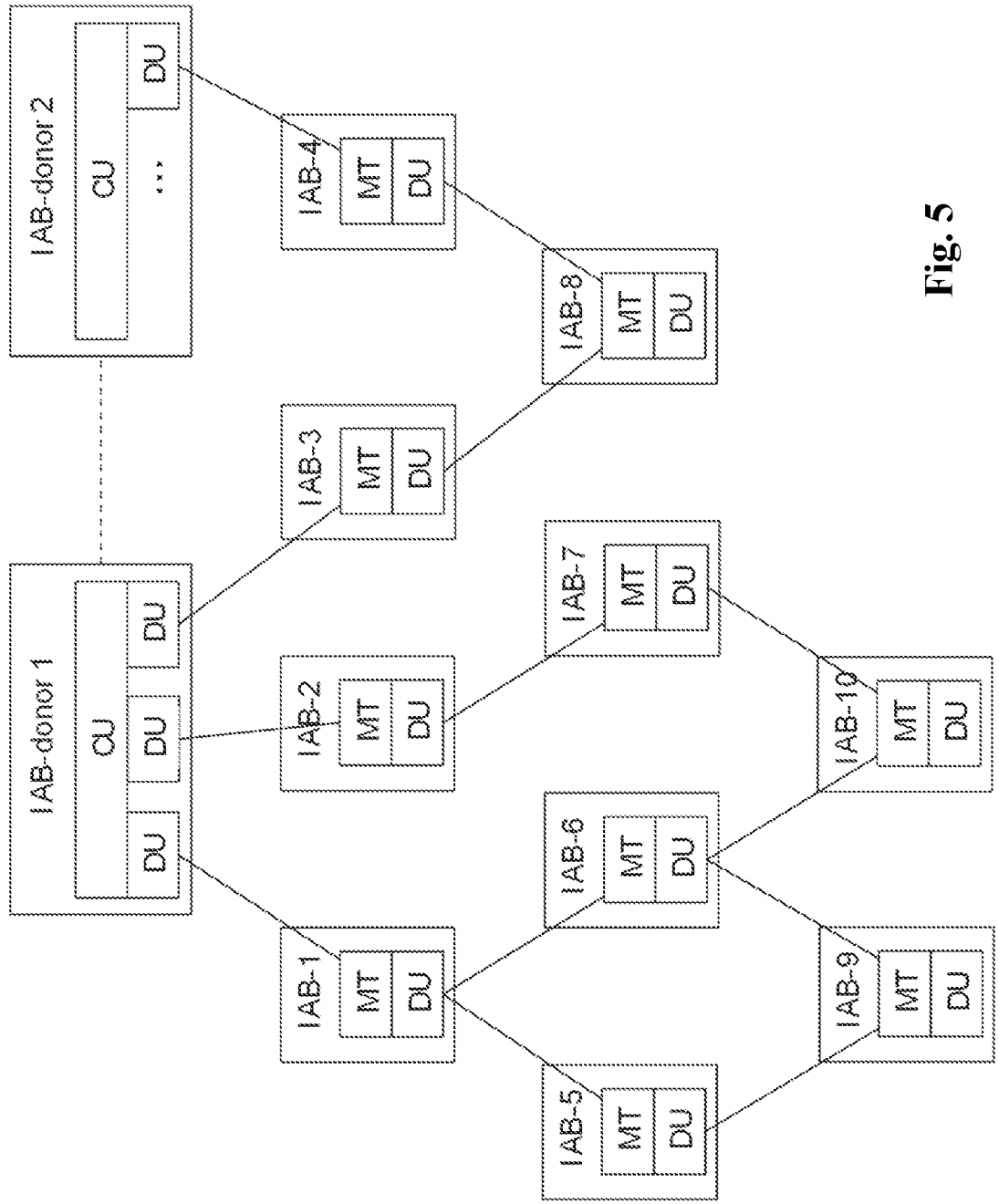
FIG. 5 illustrates an example of a multi-parent scenario.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof Disclaimers The present disclosure applies to IAB-MT using NR-DC or E-UTRAN New Radio-Dual Connectivity (EN-DC) to connect to two parent nodes and donor nodes.

The terms "reference network function" and "reference donor-CU" are used interchangeably.

The present disclosure is exemplified in the case where both the reference and peer donors are split into donor-CU and donor-DU (referred to "reference/peer donor-CU" in the text), but it equally applies to the case when one of the nodes serving the IAB node is an integral (i.e. non-split) gNB—for example, the peer node serving the IAB-MT can be a non-split gNB, in which case the peer parent and peer donor-CU are one and the same node.

The connection of the IAB-MT to two parent nodes and network functions may be established by using e.g. NR-DC, EN-DC, dual IAB protocol stack or multi-MT.

A network function is referred to as the center unit which provides resource configurations to IAB-DU and IAB-MT. The network function can be located:

at a node in the Radio Access Network (RAN), for example an IAB-CU;
  or as a separate function residing in the core network (for example the Operation, Administration and Management (OAM) function).

When an IAB-node connects to multiple parent nodes which are under the control of different network functions, the reference network function (e.g., the reference donor-CU) is responsible for the IAB-DU configuration, since this is the CU that maintains the F1AP connection to the IAB-DU. The parent IAB-node which is under the control of the reference network function is referred to as the reference parent node.

When an IAB-node connects to multiple parent nodes which are under the control of different network functions, the peer network function (e.g., the peer donor-CU) is not responsible for the IAB-DU configuration, as it has no F1AP connection to the IAB-DU (an IAB-DU can maintain only one connection at a time, and that one is maintained with the reference donor-CU). The parent IAB-node which is under the control of the peer network function is referred to as the peer parent node.

In other words, the terms "reference" and "peer" herein are defined with respect to which node controls the F1AP connection of the IAB-DU (assuming one IAB-DU is present in the IAB node).

The terms "donor IAB node" and "donor" and "donor node" are used interchangeably. The terms "parent IAB node" and "parent" and "parent node" are used interchangeably.

This disclosure provides methods to enable Inter-donor multi-parent operations (including dual-connectivity, multi-MT, dual IAB protocol stack, etc.). The resource configuration and coordination for Intra-donor multi-parent operation is provided in the provisional application with Ser. No. 63/062,893, which details how to coordinate resource multiplexing between child and parent links in Intra-donor multi-parent operation where the parent and IAB-nodes belong to the same donor-node for example.

As mentioned above, the reference donor-CU controls the reference parent link and also the IAB-DU, meaning that the resource configuration of MT and DU of the reference parent node, and IAB-DU resource, are configured by the reference donor-CU. The peer donor-CU controls the peer parent link. The MT and DU resource configuration of the peer parent node is configured by the peer donor-CU. It is not possible for the peer-parent node to know about IAB-DU resource configuration. Embodiments in this disclosure allow to solve this potential resource conflict.

The embodiments provide, for example:

The peer donor-CU and reference donor-CU can exchange configuration information;

The peer parent node and reference parent node can exchange configuration information;

The peer parent node/donor-CU can send resource configuration requests to the reference parent node/donor-CU;

The reference parent node and reference donor-CU can respond with an acknowledgment/Negative acknowledgment (ACK/NACK) to the request from the peer donor-CU and peer parent node. Some more detailed methods for coordinating resource configurations at an IAB node connected to a reference parent IAB node (connected to a reference donor node) and a peer parent IAB node (connected to a peer donor node) are provided below.

Methods at the Reference Network Functions

The network functions (e.g., a donor-CU) are responsible for resource configuration of their served IAB and parent nodes. When an IAB-node connects to multiple parent nodes which are under the control of different network functions, the reference network function (e.g., the reference donor-CU) is responsible for IAB-DU resource configuration. The reference network function can perform the following operations:

1) receives information about the capabilities of the IAB-node to multiplex between the more-than-one parent links connecting/connected to the reference and peer network functions. The multiplexing capability can include, but not limited to: Time division multiplexing (TDM), which means that the multiple parent links (or a part of them) cannot be used simultaneously; Frequency division multiplexing (FDM), which means that the multiple parent links (or a part of them) can be used simultaneously by dividing frequency resources, including the case treating two non-overlapping bandwidth parts as independent carriers; Space division multiplexing (SDM), which means that the multiple parent links (or a part of them) can be used simultaneously on (partly) overlapping frequencies on different spatial domain resources (e.g., beams); Simultaneous DL on (some of) the multiple parent links; Simultaneous UL on (some of) the multiple parent links and Simultaneous DL/UL on (some of) the multiple parent links.

2) receives information on the multiplexing capability (including TDM, FDM, SDM) between the IAB-DU and IAB-MT, from the IAB node;

3) determines a resource configuration to the reference parent node. The determination can be based on received capability information, if provided. In an example, the reference parent node which is controlled by the reference network function (i.e. reference donor-CU) has always higher priority than the peer parent node, for example. More specifically, it means that the reference parent node's resource configuration has priority over the peer parent node's resource configuration. Taking an example of dynamic resource configurations, the semi-static resource configuration of a certain time/frequency resource is flexible. By dynamic signaling, the reference parent node indicates this resource should be DL, but the peer parent node indicates this resource should be UL. The IAB-MT that receives both dynamic signaling should follow the indication of the reference parent node, i.e. the resource that will be used for DL is indicated by the reference parent node.

4) determines a resource configuration for the connected IAB-DU, for example, based on received capability information, if provided. Also, the reference network function may receive resource configuration requests for a certain IAB-DU resource from the peer parent node via the peer network function. For example, the peer parent node can send the request via F1 to the peer network function, which forwards the request to the reference network function. In one example, the request can be sent by the IAB-MT of the IAB-node via peer parent node to the peer donor-CU (by using e.g. the SRB3 connection of the IAB-MT to the peer donor-CU), which then forwards it to the reference donor-CU. In another example, the traffic for the F1AP connection between the IAB-DU and reference donor-CU is carried via the peer parent node, the request is sent by the parent-DU of the peer parent-node (this way of connectivity, i.e. carrying F1 traffic between the reference donor-CU and the IAB-DU via the peer donor-CU, is referred to in Rel-17 as CP/UP separation). Furthermore, the reference network function may provide an ACK/NACK response to the peer network function regarding the IAB-DU resource configuration request from the reference parent node. Also, the reference network function may provide a counteroffer of resources, where the resources offered are different than the ones requested by the peer node. For example, the reference network function can determine a first resource configuration for the IAB node as comprising Flexible and NA resources. The peer network function can request a second resource configuration for the IAB node as comprising Hard resources for the DL. In response to the request, the reference network function can send a counteroffer of a resource configuration comprising soft resources for DL.

5) sends (an indication of) a resource configuration to the reference parent node and IAB-node based on the received information, for example, about the multiplexing capabilities, resource configuration request, etc.

6) provides resource configuration information/indication of the reference parent node to other peer network function(s) or peer parent node(s). The involved network functions may exchange/align information, such as TDD pattern, the involved parent nodes' DU resource configurations, etc., to avoid configuring conflicting resources to the associated parent nodes.

7) sends information/indication of the IAB-DU resource configurations to a peer network function to which at least one parent node of the IAB-node is connected.

The IAB-DU may be configured by multiple donor-CUs independently if an IAB-node has multiple F1 interfaces towards multiple central units. This includes both the case when an IAB-node contains multiple IAB-DUs (e.g., running on different hardware) and the case where an IAB-node contains multiple virtual DUs (e.g., running on the same hardware).

It should be noted that the term "more-than-one parent links" means the multiplexing capability of the parent links, for example if the parent links can do TDM, FDM or SDM. Further, there is also another multiplexing capability between the parent link and child link, if they can perform TDM, FDM, SDM.

For example, the parent links might compete about resources. Multiplexing parent links means, resources that are used on both parent links could be shared in a TDM, FDM or SDM fashion. TDM would be that certain symbols (time resources) would be used on parent link 1, but not on parent link 2. Certain other time resources would be used on parent link 2, but not simultaneously on parent link 1. For FDM, within the same symbol, certain frequency resources (resource blocks or groups of RBs or RBGs) could be used for parent link 1, but not link 2, and certain other frequency resources would be used for link 2, but not 1. In SDM, a node could use different beams for parents 1 and 2, simultaneously, using the same symbols (in time) and frequency resources.

The capabilities to do TDM, FDM or SDM can depend on implementation capabilities and/or deployment/channel (in general situational) capabilities. For example, if an IAB-node has no sufficient beam separation, because there is not enough antenna element to create sharp beams and the parent nodes are too close in direction that the existing beam patterns can transmit/receive on both parent links without interference. For FDM, a node might not have the hardware capabilities to operate in FDM, i.e., capability to separate frequency resources such that both parents could receive at the same time; this could be because the parents' receivers are not synchronized (because of different propagation delays), but the IAB-node has only one transmitter chain that is synchronized for all frequency resources.

Methods at the Peer Network Functions

The network functions (e.g., a donor-CU) are responsible for resource configuration of the involved IAB-node and parent nodes. When an IAB-node connects to multiple parent nodes which are under the control of different network functions, the peer network function (e.g., the peer donor-CU) is not responsible for IAB-DU configuration, since the IAB-DU maintains the FLAP connection with the reference donor-CU. The peer network function may perform the following operations:

1) receives information on the multiplexing capability of the IAB-node between the more-than-one parent links (which are under the control of the reference and peer donor-CUs), from the reference donor-CU. The multiplexing capability can include: TDM, FDM, SDM, Simultaneous DL on (some of) the multiple parent links; Simultaneous UL on (some of) the multiple parent links; and Simultaneous DL/UL on (some of) the multiple parent links. The different multiplexing capabilities (TDM, FDM, SDM, etc.) are defined as in the section describing the methods at the reference network function.

2) receives information from the reference donor-CU on the multiplexing capability (including TDM, FDM, SDM) between the IAB-DU and IAB-MT.

3) determines resource configuration of the peer parent node based on the (optionally) received multiplexing capability information. As an example, the parent node which is under the control of the peer network function has always lower priority (meaning that the resource configuration at the reference parent node takes precedence over the resource configuration at the peer parent node). In one example, the peer network function may forward a resource configuration request from the peer parent node to the reference network function for a certain DU resource of the reference network function. The peer network function may receive an ACK/NACK response from the reference network function regarding the IAB-DU resource configuration request from the peer parent node. Also, the peer network function may forward the ACK/NACK response from the reference network function to the peer parent node regarding a certain IAB-DU resource configuration request.

4) sends a resource configuration to the peer parent node based on the received information, for example, about the multiplexing capability.

5) receives information of the IAB-DU resource configurations from the reference network function.

6) sends the received information of the IAB-DU resource configurations (or an indication of the received information) to the peer parent node.

7) provides the resource configuration of the peer parent node(s) to the reference network function.

As a note, in one example, the peer network function can also determine a resource configuration for the IAB node, based for example, on the received multiplexing capabilities. If the determined resource configuration does not match the resource configuration for the IAB node provided by the reference network function, the peer network function can send a request to the reference network function for its determined resource configuration.

In another example, after receiving the indication of resource configuration for the IAB node, from the reference network function, the peer network function can check if the indicated resource configuration fits (or compatible with) the capabilities (e.g. multiplexing capabilities) of its network. If the indicated resource configuration does fit its capabilities, the peer network function can determine a resource configuration (based on the multiplexing capabilities, for example) and send a request for the determined resource configuration to the reference network function.

After receiving the resource configuration from the peer network node, the reference network node can determine a resource configuration for the IAB node, based at least on the received resource configuration for example, in order to avoid configuring conflicting resources. The reference network node can also determine that the resource configuration for the IAB node is the resource configuration that it has determined based on the multiplexing capabilities received from the IAB node and thus the reference network function ignores the resource configuration request from the peer network function.

The IAB-DU resources may be configured by multiple donor-CUs independently if an IAB-node has multiple F1 interfaces towards multiple central units. This includes both the case when an IAB-node contains multiple IAB-DUs (e.g., running on different hardware) and the case where an IAB-node contains multiple virtual DUs (e.g., running on the same hardware).

Methods at the Reference Parent Node which is Under the Control of the Reference Network Function In addition to its own DU resource configurations, the parent node may also receive DU resource configurations of other peer parent node(s) that provide(s) connectivity to the same IAB-node.

The reference parent node can also receive the resource configuration request for a certain IAB-DU resource from the peer parent node(s) and/or peer donor-CU(s), via the reference donor-CU.

The reference parent node can provide the ACK/NACK response to the resource configuration request for a certain IAB-DU resource from the peer parent node(s) and/or peer donor-CU(s), via the reference donor-CU.

Certain rules can be defined between the reference and peer parent nodes when competing for certain resources, as follows:
  Determining a primary parent node (e.g., the one serving MCG), which has higher priority;
  Determining at least one secondary parent node;
  Identifying a condition among the reference and peer parent nodes. The condition can be a resource collision condition, or a resource starvation condition;
  Optionally transmitting a message between the reference parent node and at least one of the other peer parent nodes. The way of transmitting the message can be via the commonly connected IAB-node (this could be via a forward mechanism on Media Access Control (MAC) layer level or alternatively on the BAP layer level) or directly between the reference and peer parent nodes.

Methods at the Peer Parent Node which is Under the Control of the Peer Network Function The peer parent node can receive the IAB-DU resource configurations. In one example, the resource configurations are received from the reference network function, via the peer network function. The resource configurations can be also received from the peer network function which also has F1 interface towards the IAB-node. In another example, the resource configurations are directly forwarded by the IAB-node, via a Layer-1 interface.

In addition to its own DU resource configurations, the peer parent node may also receive DU resource configurations of the reference parent node that provides connectivity to the same IAB-node.

The peer parent node may receive information from the peer donor-CU on the multiplexing capability of the IAB-node between the more-than-one parent links. The multiplexing capability can include: TDM, FDM, SDM; Simultaneous DL on (some of) the multiple parent links; Simultaneous UL on (some of) the multiple parent links; Simultaneous DL/UL on (some of) the multiple parent links. The different multiplexing capabilities (TDM, FDM, SDM, etc.) are defined as in the section describing the methods at the reference network function.

The peer parent node can send the resource configuration request for a certain IAB-DU resource to the reference parent node(s) and/or reference donor-CU(s), via the peer donor-CU. It can receive the ACK/NACK response to the resource configuration request for a certain IAB-DU resource from the reference parent node(s) and/or reference donor-CU(s), via the peer donor-CU. Further, it may receive from the reference donor-CU a desired DU resource configuration which is configured by the peer donor-CU, by informing its own donor-CU about the response to the DU resource configuration request from the reference donor-CU and the reference parent node. The peer donor-CU may forward the ACK/NACK to the DU resource configuration request to the peer donor-CU. The peer donor-CU may forward the ACK/NACK response to the reference parent node. The reference parent node may schedule the resource according to the ACK/NACK response from the peer donor-CU and the peer parent node.

Methods at IAB-Nodes

When connecting to more than one parent node, the IAB-node can perform the following operations.
  1) determines its multiplexing capability between the more-than-one parent links, which may be under the control of the reference or the peer network functions. The multiplexing capability can be based on certain component carrier (CC) pairs and/or certain resource block (RB) group combinations, for example. The IAB-node multiplexing capability can include: TDM, FDM, SDM, Simultaneous DL on (some of) the multiple parent links; Simultaneous UL on (some of) the multiple parent links; Simultaneous DL/UL on (some of) the multiple parent links; Multiplexing capability (including TDM, FDM, SDM) between the IAB-DU and IAB-MT. The different multiplexing capabilities (TDM, FDM, SDM, etc.) are defined as in the section describing the methods at the reference network function.
  2) sends the multiplexing capability to the reference network function (e.g., the reference donor-CU) and/or (optionally) to each parent node under the control of the reference and peer donor-CUs.

With regards to an IAB-DU soft resource, the IAB-node may receive multiple explicit indications (e.g., DCI Format 2_5) from more than one parent node.

After obtaining information of resource usage/allocation of one (or more) parent node(s), the IAB-node may provide it to another parent node. In this case, the parent nodes may have a prioritization order such that a higher prioritized parent node gets to allocate certain resources prior to less prioritized parent nodes.

Topology Adaptation

In case of topology adaptation for whatever reason (e.g., IAB-node mobility, load balancing, radio link failure), e.g., where the IAB-node changes its peer parent, two cases are possible:
  If the new peer parent is under the same peer donor-CU as the old one, the peer donor-CU may notify the new peer parent about the resource configuration used at the IAB-node when the IAB-node was served by the old peer parent.
  If the new peer parent is under a peer donor-CU different than the old one, the old peer donor-CU may notify the new peer donor-CU about the resource configuration used at the IAB-node when the IAB-node was served by the old peer parent. The new peer donor-CU then notifies the new peer parent about this configuration.

The intention with the above is to speed up the coordination. If the previously received configuration is acceptable for the new peer parent and/or donor-CU, the new peer parent and/or donor-CU may simply send a confirmation message to the reference donor-CU and reference parent, confirming that the configuration previously negotiated with the old peer parent and/or donor-CU is still valid.

Generally, the network function which provides resource configuration to IAB-DU and IAB-MT can be located at a node in the RAN (for example an IAB-CU) or can be a separate function residing in the core network (for example the Operation, Administration and Management (OAM) function).

The peer network function may send a resource configuration request regarding a certain DU resource configuration to the reference parent node. The reference network function may respond with an ACK/NACK to the resource configuration request.

The reference network function may send a resource configuration request regarding a certain DU resource configured to the peer parent node. The peer network function may respond with an ACK/NACK to the resource configuration request.

The reference network function and the peer network function may exchange their role, accordingly the reference parent node and the peer parent node may do the same.

Figure 8:
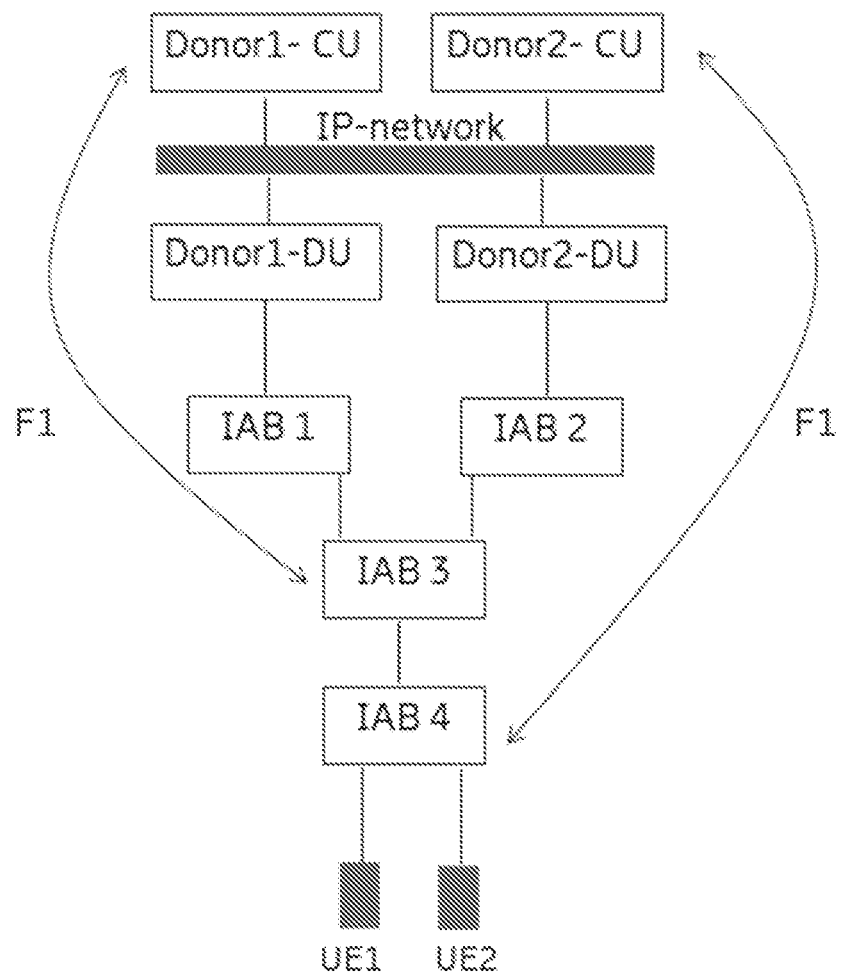
FIG. 8 shows an example of the IAB-node and its child node belonging to different donor nodes.

The IAB-node and its child and grandchild node(s) may have F1 interface towards different donor nodes, as illustrated in FIG. 8. For example, the IAB-node (IAB3) and its child node (IAB4) belong to different donor-CUs. In this case, the reference donor-CU may inform the peer donor-CU about DU resource configurations of child-node(s) or grand-child node(s) under the control of the reference donor-CU. The peer donor-CU may inform the reference donor-CU about the DU resource configurations of child-node(s) or grand-child nodes under control of the peer donor-CU. The reference parent node can be made aware of the DU resource configurations of child-node(s) or grand-child node(s) which belong to the peer donor node. The peer parent node can be made aware of the DU resource configurations of child-node(s) or grand-child node(s) which belong to the reference donor node.

The reference parent node may provide the reference donor node with a desired resource configuration for a certain IAB-DU resource (including child and grand-child nodes) which belongs to the peer-donor node, by informing the reference donor-CU about a desired DU resource configuration of the peer donor node. The reference donor-CU may forward the desired DU resource configuration (configured to child and/or grand-child nodes) to the peer donor node. The peer donor node may respond with an ACK/NACK to the DU resource configuration request from the reference donor-CU and the reference parent node. The reference donor-CU may forward the ACK/NACK response of the peer donor-CU to the reference parent node. The reference parent node may schedule the resource according to the ACK/NACK response of the peer donor node if provided.

The peer parent node may provide the peer-donor node with a desired resource configuration for a certain IAB-DU resource (including child and grand-child-nodes) which belongs to the reference donor node, by informing the peer donor-CU about a desired DU resource configuration (configured to child and/or grand-child nodes) of the reference donor node. The peer donor-CU may forward the desired DU resource configuration to the reference donor node. The reference donor node may respond with ACK/NACK to the DU resource configuration request from the peer donor-CU and the peer-parent-node. The peer donor-CU may forward the ACK/NACK response of the peer donor-CU to the reference parent node. The reference parent node may schedule the resource according to the ACK/NACK response of the peer donor node if provided.

As a note, the term "resource" in this disclosure refers generally to both time and frequency resources.

X2/Xn Signaling

The coordination messages described herein are carried between the reference donor-CU and peer donor-CU by using Xn or X2 signaling (in case of IAB-MT being connected to the network via NR-DC or EN-DC, respectively). For this purpose, existing Xn/X2 messages can be enhanced or new messages can be defined.

In an example, one X2/Xn message can carry the coordination message pertaining to only one IAB node.

In another example, the reference or peer donor-CU can merge coordination messages pertaining to two or more IAB nodes into the same X2/Xn message.

Figure 6:
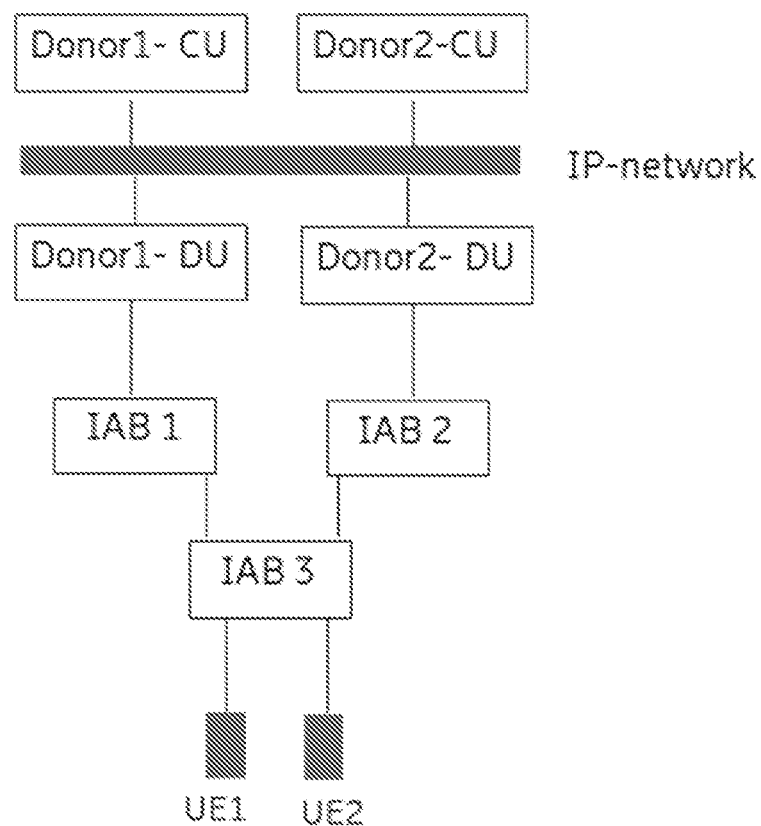
FIG. 6 shows an example illustrating Inter-Donor dual connectivity.
Figure 7:
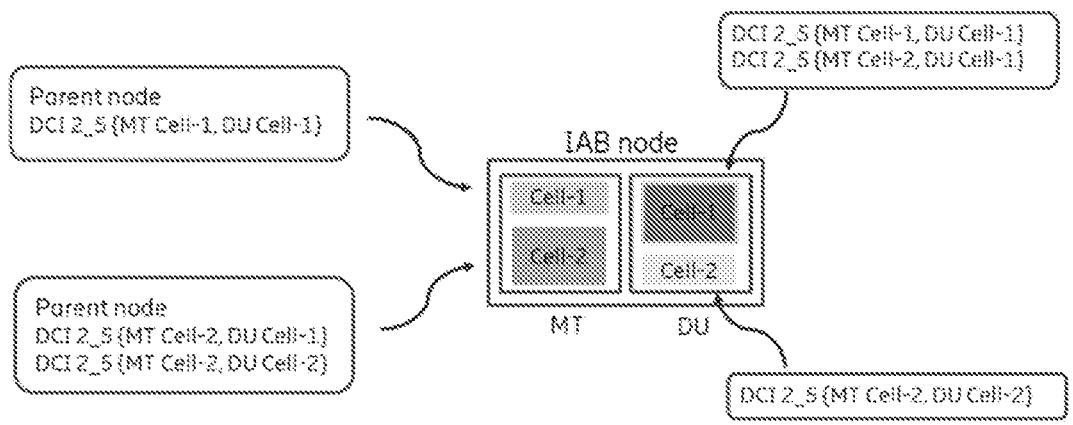
FIG. 7 shows an example for DCI format 2_5 indication in the dual connectivity scenario.
Figure 9:
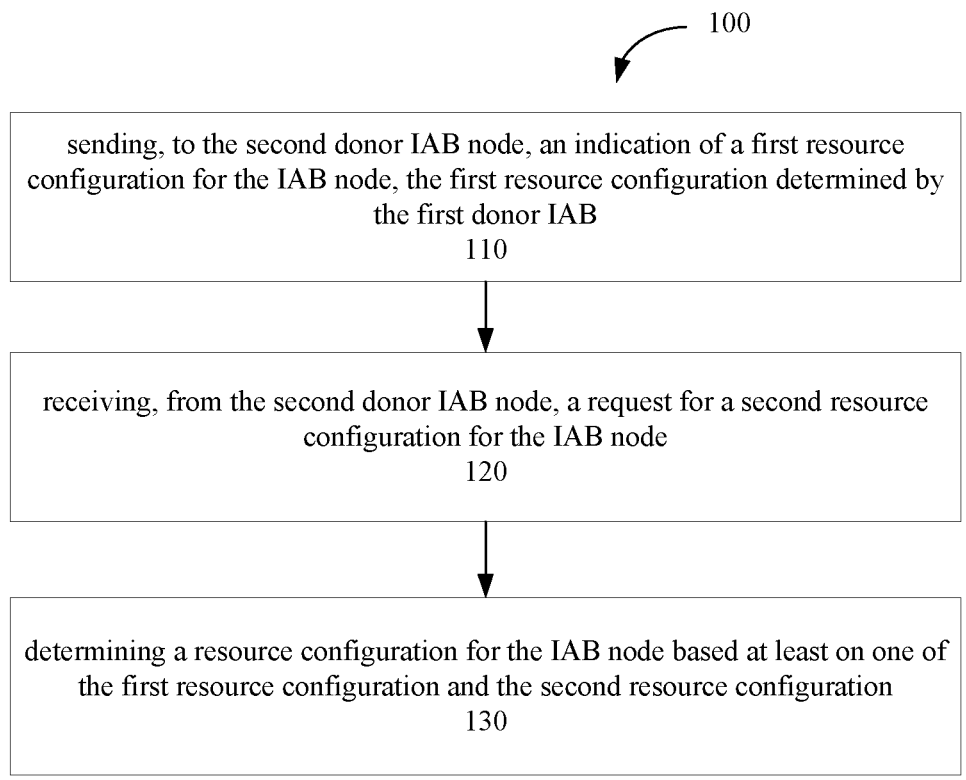
FIG. 9 is a flow chart of a method in a network node, in accordance with an embodiment.

Now turning to FIG. 9, a method 100 in an IAB node, such as a first donor IAB node, for resource coordination, will be described. Method 100 will be described in the context of FIG. 6, for example, in which an IAB node (such as IAB3) is connected to a first parent IAB node (IAB1), which is connected to a first donor IAB node (Donor1-DU/Donor1-CU). The IAB node (IAB3) is further connected to a second parent IAB node (IAB2), which is connected to a second donor IAB node (Donor2-DU/Donor2-CU). Instead of this DC case, another case can be considered in which the IAB node (IAB3) migrates from the first parent IAB node to the second parent IAB node. In this case, the second parent IAB node can be considered as the first parent IAB node in the description below. The first donor IAB node can be the reference donor node/reference network function, the second donor IAB node can be the peer donor node/peer network function, the first parent IAB node can be the reference parent node and the second parent IAB node can be the peer parent IAB node. Method 100 may comprise:

Step 110: sending, to the second donor IAB node, an indication of a first resource configuration for the IAB node, the first resource configuration determined by the first donor IAB node;

Step 120: receiving, from the second donor IAB node, a request for a second resource configuration for the IAB node; and Step 130: determining a resource configuration for the IAB node based at least on one of the first resource configuration and the second resource configuration.

The first resource configuration and the second resource configuration can correspond to a DU resource configuration and/or MT resource configuration of the IAB node. The determined resource configuration for the IAB node takes into account the first resource configuration and the second resource configuration and thus can avoid configuration of conflicting resources at the IAB node. The determination of the resource configuration can also be based on TDD patterns, H/S/NA configurations, semi-static resource, or dynamic resource etc.

In some examples, the resource configuration for the IAB node can be determined by selecting the first resource configuration for the IAB node.

In some examples, the first donor IAB node may receive an indication of first multiplexing capabilities between a first parent link from the first parent IAB node to the IAB node and a second parent link from the second parent IAB node to the IAB node. For example, the first multiplexing capabilities include one or more of TDM, FDM, SDM, simultaneous DL of a first parent link with other parent links, simultaneous UL of the first parent link with other parent links; simultaneous DL/UL on the first parent link and other parent links.

In some examples, the first donor IAB node may receive an indication of second multiplexing capabilities between a DU of the IAB node and a MT of the IAB node. For example, the multiplexing capabilities include one or more of TDM, FDM and SDM.

In some examples, the first resource configuration can be determined based at least on one or more of the indication of the first multiplexing capabilities and the second multiplexing capabilities.

In some examples, the first donor IAB node can determine a third resource configuration for the first parent IAB node, the third resource configuration being determined based at least on the first resource configuration and the second resource configuration. The third resource configuration may be an updated resource configuration (e.g. updating the first resource configuration to be adapted for the first parent IAB node).

In some examples, a resource configuration indication from the first parent IAB node has a higher priority compared to a resource configuration indication from the second parent IAB node. Indeed, a master cell group (MCG) link will have the priority. In most cases, the first parent link is the MCG link.

In some examples, the request for the second resource configuration received from the second donor IAB node can be received via Xn or X2.

In some examples, the first donor IAB node may send an ACK response to the second donor IAB node in response to determining that the resource configuration for the IAB node is the second resource configuration. It can also send a NACK to the second donor IAB node in response to determining that the resource configuration for the IAB node is different from the second resource configuration.

In some examples, the first donor IAB node may send an indication of the determined resource configuration for the IAB node to one or more of the first parent IAB node, the IAB node, the second parent IAB node and the second donor IAB node.

In some examples, the first donor IAB node may receive a request for a resource (or resource configuration) associated with a certain IAB-DU, from the second parent IAB node, via the second donor IAB node.

In some examples, the first donor IAB node may receive a request for a resource (or resource configuration) from a MT of the IAB node, via the second parent IAB node and the second donor IAB node.

Figure 10:
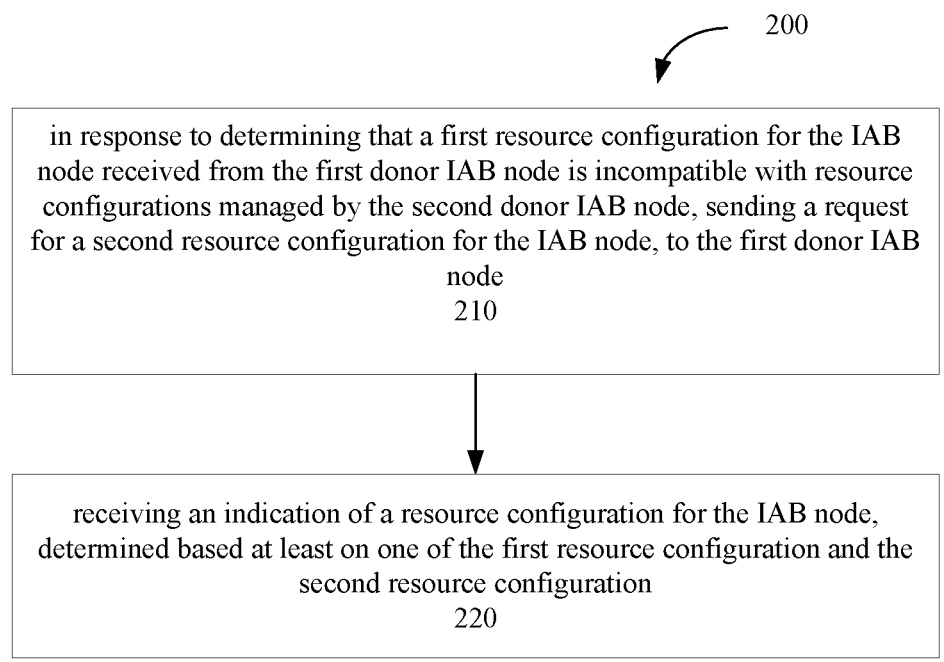
FIG. 10 is a flow chart of a method in a network node, in accordance with an embodiment.

FIG. 10 illustrates a method 200 in a network node, such as a donor IAB node, for resource coordination. Method 200 will be described in the context of FIG. 6, for example, in which an IAB node (such as IAB3) is connected to a first parent IAB node (IAB1), which is connected to a first donor IAB node (Donor1-DU/Donor1-CU). The IAB node (IAB3) is further connected to a second parent IAB node (IAB2), which is connected to a second donor IAB node (Donor2-DU/Donor2-CU). Instead of this DC case, another case can be considered in which the IAB node (IAB3) migrates from the first parent IAB node to the second parent IAB node. In this case, the second parent IAB node can be considered as the first parent IAB node in the description below. The network node may correspond to the second donor IAB node. Method 200 comprises:

Step 210: in response to determining that a first resource configuration for the IAB node received from the first donor IAB node is incompatible with resource configurations managed by the second donor IAB node, sending a request for a second resource configuration for the IAB node, to the first donor IAB node; and Step 220: receiving an indication of a resource configuration for the IAB node, determined based at least on one of the first resource configuration and the second resource configuration.

In some examples, the second donor IAB node may receive, from the first donor IAB node, an indication of first multiplexing capabilities between a first parent link from the first parent IAB node to the IAB node and a second parent link from the second parent IAB node to the IAB node. For example, the first multiplexing capabilities include one or more of TDM, FDM, SDM, simultaneous DL of a first parent link with other parent links, simultaneous UL of the first parent link with other parent links; simultaneous DL/UL on the first parent link and other parent links.

In some examples, the second donor IAB node may receive, from the first donor IAB node, an indication of second multiplexing capabilities between a DU of the IAB node and a mobile MT of the IAB node, such as TDM, FDM and SDM.

In some examples, the second resource configuration for the IAB node can be determined based at least on one or more of the received first and second multiplexing capabilities.

In some examples, the second donor IAB node can determine a resource configuration for the second parent IAB node based at least on one or more of the received first and second multiplexing capabilities.

In some examples, the second donor IAB node can receive an ACK response from the first donor IAB node when the indicated resource configuration determined for the IAB node corresponds to the second resource configuration or it can receive a NACK from the first donor IAB node when the indicated resource configuration determined for the IAB node is different from the second resource configuration.

In some examples, the second donor IAB node can forward the received ACK response or NACK response to the second parent IAB node.

In some examples, if the IAB node migrates to another second parent IAB node (which may not be connected to the second donor IAB node), in this case, the second donor IAB node sends to the other second parent IAB node an indication of the resource configuration determined for the IAB node.

In some examples, the second donor IAB node may adjust a resource configuration for the second parent node, based on the indicated resource configuration received from the first donor IAB node.

In some examples, the request for the second resource configuration can be sent to the first donor IAB node via Xn or X2.

Furthermore, a method at the first parent IAB node can comprise the following steps (following the same terminology and context as methods 100 and 200):

receive a first resource configuration from the first donor IAB node;

receive a second resource configuration from the second parent IAB node; and scheduling transmissions of data according to the first and second resource configurations.

This method may further comprise receiving a request for resource configuration for a certain IAB-DU resource from the second parent IAB node. In response to the request, the first parent IAB node can respond with an ACK/NACK.

Also, when scheduling the transmissions, the first parent IAB node can determine some rules/conditions and priorities.

Moreover, a method at the second parent IAB node can comprise the following steps (following the same terminology and context as methods 100 and 200):
- receive a first resource configuration for the IAB node, from the first donor IAB node, via the second donor IAB node (or directly from the IAB node); and
- receive a second resource configuration from the first parent IAB node.

Figure 11:
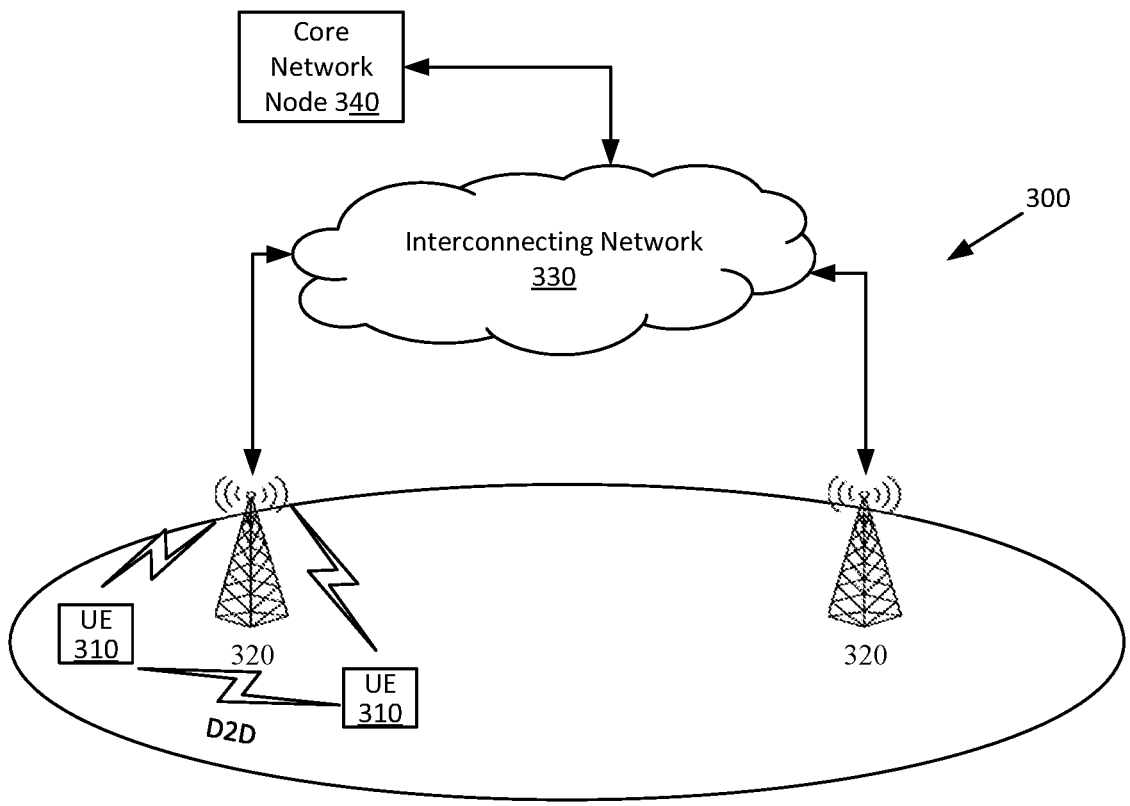
FIG. 11 illustrates one example of a wireless communications system in which embodiments of the present disclosure may be implemented.

FIG. 11 illustrates an example of a wireless network 300 that may be used for wireless communications. Wireless network 300 includes UEs 310 and a plurality of radio network nodes 320 (e.g., Node Bs (NBs) Radio Network Controllers (RNCs), evolved NBs (eNBs), next generation NB (gNBs), etc.) directly or indirectly connected to a core network 330 which may comprise various core network nodes. The network 300 may use any suitable radio access network (RAN) deployment scenarios, including Universal Mobile Telecommunication System (UMTS) Terrestrial Radio Access Network (UTRAN), and Evolved UMTS Terrestrial Radio Access Network (EUTRAN). UEs 310 may be capable of communicating directly with radio network nodes 320 over a wireless interface. In certain embodiments, UEs may also be capable of communicating with each other via device-to-device (D2D) communication. In certain embodiments, network nodes 320 may also be capable of communicating with each other, e.g. via an interface (e.g. X2 in LTE or other suitable interface).

As an example, UE 310 may communicate with radio network node 320 over a wireless interface. That is, UE 310 may transmit wireless signals to and/or receive wireless signals from radio network node 320. The wireless signals may contain voice traffic, data traffic, control signals, and/or any other suitable information. In some embodiments, an area of wireless signal coverage associated with a radio network node 320 may be referred to as a cell.

It should be noted that a UE may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment. The network node 320 may be an IAB node, a child IAB node, a parent IAB node or an IAB donor. Furthermore, the IAB node 320 may have components as a MT and/or DU.

In certain embodiments, network nodes 320 may interface with a radio network controller (not shown). The radio network controller may control network nodes 320 and may provide certain radio resource management functions, mobility management functions, and/or other suitable functions. In certain embodiments, the functions of the radio network controller may be included in the network node 320. The radio network controller may interface with the core network node 340. In certain embodiments, the radio network controller may interface with the core network node 340 via the interconnecting network 330.

The interconnecting network 330 may refer to any interconnecting system capable of transmitting audio, video, signals, data, messages, or any combination of the preceding. The interconnecting network 330 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 340 may manage the establishment of communication sessions and various other functionalities for wireless devices 310. Examples of core network node 340 may include MSC, MME, SGW, PGW, O&M, OSS, SON, positioning node (e.g. E-SMLC), MDT node, etc. Wireless devices 110 may exchange certain signals with the core network node 340 using the non-access stratum layer. In non-access stratum signaling, signals between wireless devices 310 and the core network node 340 may be transparently passed through the radio access network. In certain embodiments, network nodes 320 may interface with one or more other network nodes over an internode interface. For example, network nodes 320 may interface each other over an X2 interface.

Although FIG. 11 illustrates a particular arrangement of network 300, the present disclosure contemplates that the various embodiments described herein may be applied to a variety of networks having any suitable configuration. For example, network 300 may include any suitable number of wireless devices 310 and network nodes 320, as well as any additional elements suitable to support communication between wireless devices or between a wireless device and another communication device (such as a landline telephone). The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, etc. The network 300 (with the wireless devices 310 and network nodes 320) may be able to operate in LAA or unlicensed spectrum.

Figure 12:
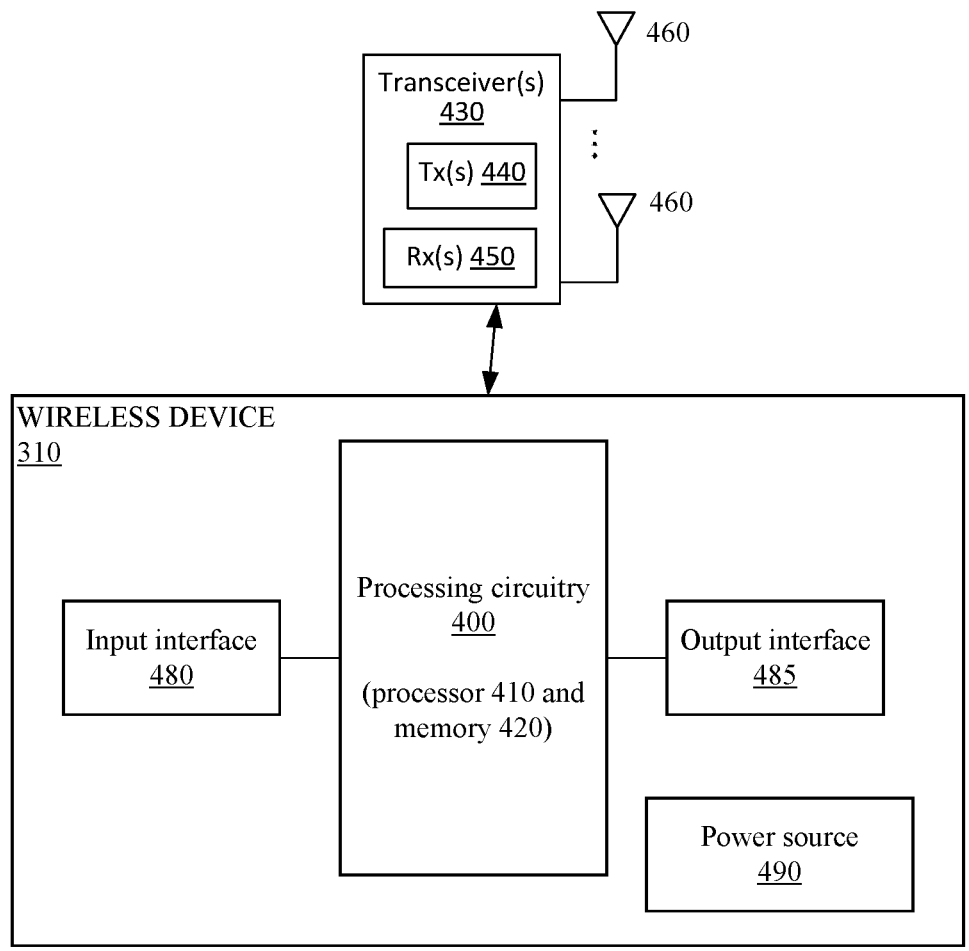
FIG. 12 is a block diagram that illustrates a wireless device according to some embodiments.

FIG. 12 is a schematic block diagram of the wireless device 310 according to some embodiments. As illustrated, the wireless device 310 includes circuitry 400 comprising one or more processors 410 (e.g., Central Processing Units (CPUs), Application Specific Integrated Circuits (ASICs), Field Programmable Gate Arrays (FPGAs), and/or the like)

and memory 420. The wireless device 310 also includes one or more transceivers 430 each including one or more transmitters 440 and one or more receivers 450 coupled to one or more antennas 460. Furthermore, the processing circuitry 400 may be connected to an input interface 480 and an output interface 485. The input interface 480 and the output interface 485 may be referred to as communication interfaces. The wireless device 310 may further comprise power source 490.

In some embodiments, the functionality of the wireless device 310 described above may be fully or partially implemented in software that is, e.g., stored in the memory 420 and executed by the processor(s) 410. For example, the processor 410 is configured to perform all the functionalities performed by the wireless device 310.

Figure 13:
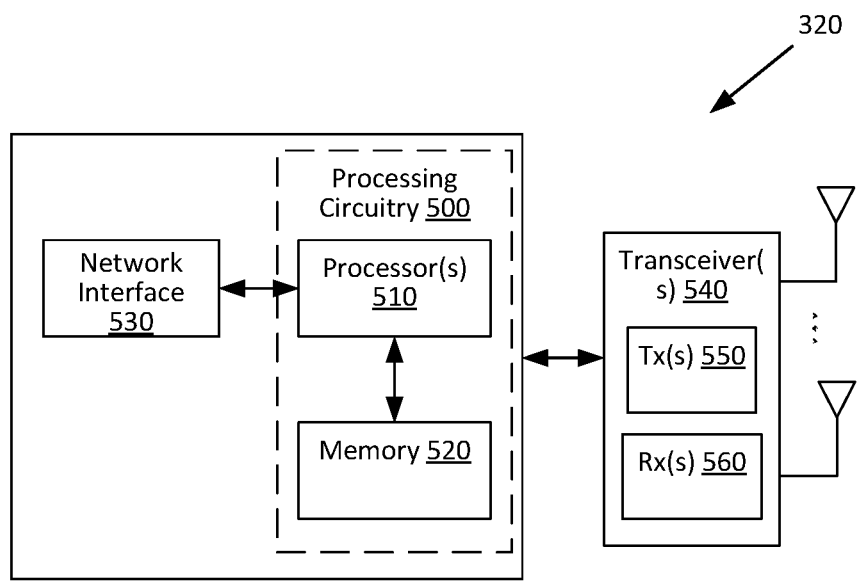
FIG. 13 is a block diagram that illustrates a network node according to some embodiments.

FIG. 13 is a schematic block diagram of a network node 320 according to some embodiments. As illustrated, the network node 320 includes a processing circuitry 500 comprising one or more processors 510 (e.g., CPUs, ASICs, FPGAs, and/or the like) and memory 520. The network node also comprises a network interface 530. The network node 320 also includes one or more transceivers 540 that each include one or more transmitters 550 and one or more receivers 560 coupled to one or more antennas 570. In some embodiments, the functionality of the network node 320 described above may be fully or partially implemented in software that is, e.g., stored in the memory 520 and executed by the processor(s) 510. For example, the processor 510 can be configured to perform any steps of the methods 100 and 200 of FIGS. 9 and 10 respectively.

Figure 14:
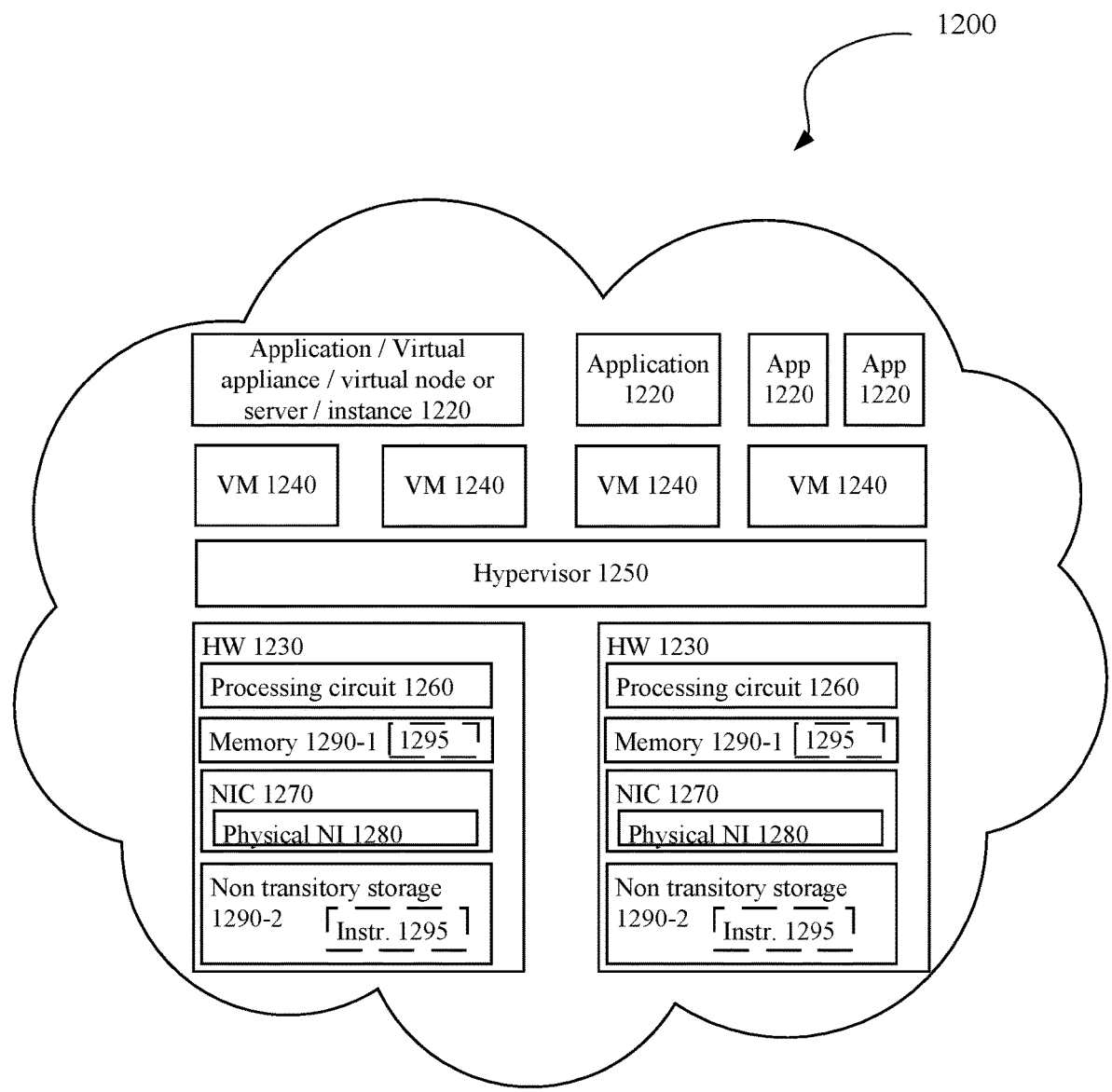
FIG. 14 illustrates a virtualized environment of a network node, according to some embodiments of the present disclosure.

FIG. 14 is a schematic block diagram that illustrates a virtualized embodiment of the wireless device 310 or network node 320, according to some embodiments. As used herein, a "virtualized" node 1200 is a network node 320 or wireless device 310 in which at least a portion of the functionality of the network node 320 or wireless device 310 is implemented as a virtual component (e.g., via a virtual machine(s) executing on a physical processing node(s) in a network(s)). For example, in FIG. 10, there is provided an instance or a virtual appliance 1220 implementing the methods or parts of the methods of some embodiments. The one or more instance(s) runs in a cloud computing environment 1200. The cloud computing environment provides processing circuits 1230 and memory 1290-1 for the one or more instance(s) or virtual applications 1220. The memory 1290-1 contains instructions 1295 executable by the processing circuit 1260 whereby the instance 1220 is operative to execute the methods or part of the methods described herein in relation to some embodiments.

The cloud computing environment 1200 comprises one or more general-purpose network devices including hardware 1230 comprising a set of one or more processor(s) or processing circuits 1260, which may be commercial off-the-shelf (COTS) processors, dedicated Application Specific Integrated Circuits (ASICs), or any other type of processing circuit including digital or analog hardware components or special purpose processors, and network interface controller(s) (NICs) 1270, also known as network interface cards, which include physical Network Interface 1280. The general-purpose network device also includes non-transitory machine readable storage media 1290-2 having stored therein software and/or instructions 1295 executable by the processor 1260. During operation, the processor(s)/processing circuits 1260 execute the software/instructions 1295 to instantiate a hypervisor 1250, sometimes referred to as a virtual machine monitor (VMM), and one or more virtual machines 1240 that are run by the hypervisor 1250.

A virtual machine 1240 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1240, and that part of the hardware 1230 that executes that virtual machine 1240, be it hardware 1230 dedicated to that virtual machine 1240 and/or time slices of hardware 1230 temporally shared by that virtual machine 1240 with others of the virtual machine(s) 1240, forms a separate virtual network element(s) (VNE).

The hypervisor 1250 may present a virtual operating platform that appears like networking hardware to virtual machine 1240, and the virtual machine 1240 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual application 1220 may be implemented on one or more of the virtual machine(s) 1240, and the implementations may be made differently.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

What is claimed is:

1. A method for resource coordination in a first donor Integrated Access Backhaul (IAB) node connected to a first parent IAB node which is connected to an IAB node, the IAB node further being connected to a second parent IAB node, which is connected to a second donor IAB node, the method comprising:

sending, to the second donor IAB node, an indication of a first resource configuration for the IAB node, the first resource configuration determined by the first donor IAB node;

receiving, from the second donor IAB node, a request for a second resource configuration for the IAB node; and determining a resource configuration for the IAB node based at least on one of the first resource configuration and the second resource configuration.

2. The method of claim 1, wherein determining the resource configuration for the IAB node comprises selecting the first resource configuration for the IAB node.

3. The method of claim 1, further comprising receiving an indication of first multiplexing capabilities between a first parent link from the first parent IAB node to the IAB node and a second parent link from the second parent IAB node to the IAB node.

4. The method of claim 3, wherein the first multiplexing capabilities include one or more of Time division multiplexing (TDM), Frequency division multiplexing (FDM); Space division multiplexing (SDM); simultaneous downlink (DL) of a first parent link with other parent links, simultaneous uplink (UL) of the first parent link with other parent links; simultaneous Downlink (DL)/Uplink (UL) on the first parent link and other parent links.

5. The method of claim 1, further comprising receiving an indication of second multiplexing capabilities between a distributed unit (DU) of the IAB node and a mobile termination (MT) of the IAB node.

6. The method of claim 5, wherein the multiplexing capabilities include one or more of TDM, FDM and SDM.

7. The method of claim 3, wherein the first resource configuration is determined based at least on one or more of the indication of the first multiplexing capabilities and the second multiplexing capabilities.

8. The method of claim 1, further comprising determining a third resource configuration for the first parent IAB node, the third resource configuration being determined based at least on the first resource configuration and the second resource configuration.

9. The method of claim 8, wherein a resource configuration indication from the first parent IAB node has a higher priority compared to a resource configuration indication from the second parent IAB node.

10. The method of claim 1, wherein the request for the second resource configuration received from the second donor IAB node is received via Xn or X2.

11. The method of claim 3, further comprising sending an acknowledgement (ACK) response to the second donor IAB node in response to determining that the resource configuration for the IAB node is the second resource configuration.

12. The method of claim 1, further comprising sending a negative acknowledgement (NACK) to the second donor IAB node in response to determining that the resource configuration for the IAB node is different from the second resource configuration.

13. The method of claim 1, further comprising sending an indication of the determined resource configuration for the IAB node to one or more of the first parent IAB node, the IAB node, the second parent IAB node and the second donor IAB node.

14. A method for resource coordination in a second donor Integrated Access Backhaul (IAB) node connected to a second parent IAB node, the second parent IAB node being connected to the IAB node, the IAB node further being connected to a first parent IAB node being connected to a first donor IAB node, the method comprising:

in response to determining that a first resource configuration for the IAB node received from the first donor IAB node is incompatible with resource configurations managed by the second donor IAB node, sending a request for a second resource configuration for the IAB node, to the first donor IAB node; and receiving an indication of a resource configuration for the IAB node, determined based at least on one of the first resource configuration and the second resource configuration.

15. The method of claim 14, further comprising receiving, from the first donor IAB node, an indication of first multiplexing capabilities between a first parent link from the first parent IAB node to the IAB node and a second parent link from the second parent IAB node to the IAB node.

16. The method of claim 15, wherein the first multiplexing capabilities include one or more of Time division multiplexing (TDM), Frequency division multiplexing (FDM); Space division multiplexing (SDM); simultaneous downlink (DL) of a first parent link with other parent links, simultaneous uplink (UL) of the first parent link with other parent links; simultaneous DL/UL on the first parent link and other parent links.

17. The method of claim 14, further comprising receiving, from the first donor IAB node, an indication of second multiplexing capabilities between a distributed unit (DU) of the IAB node and a mobile termination (MT) of the IAB node.

18. The method of claim 17, wherein the second multiplexing capabilities include one or more of TDM, FDM and SDM.

19. The method of claim 14, wherein the second resource configuration for the IAB node is determined based at least on one or more of the received first and second multiplexing capabilities.

20. A network node comprising a communication interface and processing circuitry connected thereto, the network node being a first donor Integrated Access Backhaul (IAB) node connected to a first parent IAB node which is connected to an IAB node, the IAB node further being connected to a second parent IAB node, which is connected to a second donor IAB node, the processing circuitry configured to:

send, to the second donor IAB node, an indication of a first resource configuration for the IAB node, the first resource configuration determined by the first donor IAB node;

receive, from the second donor IAB node, a request for a second resource configuration for the IAB node, and determine a resource configuration for the IAB node based at least on one of the first resource configuration and the second resource configuration.

\* \* \* \* \*